United States Patent
Chitragar et al.

(10) Patent No.: US 12,411,929 B2
(45) Date of Patent: Sep. 9, 2025

(54) CAPTCHA IMAGE GENERATION AND VERIFICATION BASED ON ATTRIBUTES

(71) Applicant: International Business Machines Corporation, Armonk, NY (US)

(72) Inventors: Mahesh Malatesh Chitragar, Bangalore (IN); L V Sainadha Rakesh Polepeddi, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 18/169,358

(22) Filed: Feb. 15, 2023

(65) Prior Publication Data

US 2024/0273177 A1   Aug. 15, 2024

(51) Int. Cl.
*G06F 21/36* (2013.01)

(52) U.S. Cl.
CPC .................................. *G06F 21/36* (2013.01)

(58) Field of Classification Search
CPC ....................................................... G06F 21/36
See application file for complete search history.

(56) References Cited

U.S. PATENT DOCUMENTS

| | | | |
|---|---|---|---|
| 9,870,461 B2 | 1/2018 | Akula | |
| 2010/0095350 A1* | 4/2010 | Lazar | G06F 21/36 726/3 |
| 2012/0246737 A1* | 9/2012 | Paxton | G06F 16/24578 726/27 |
| 2013/0145441 A1 | 6/2013 | Mujumdar | |
| 2023/0028042 A1* | 1/2023 | Choi | G06V 20/59 |

FOREIGN PATENT DOCUMENTS

KR   101709112 B1   2/2017

OTHER PUBLICATIONS

Cheng et al., "Image-based CAPTCHAs based on neural style transfer", IET Information Security, © The Institution of Engineering and Technology, 2019, 11 pages.

Das et al., "Automated CAPTCHA Generation From Annotated Images using Encoder Decoder Architecture", © 2016 IEEE, 6 pages, <https://ieeexplore.ieee.org/document/7966808>.

Jia et al., "TICS: text-image-based semantic CAPTCHA synthesis via multi-condition adversarial learning", The Visual Computer, Published online: Feb. 9, 2021, Springer, 13 pages.

* cited by examiner

*Primary Examiner* — Hany S. Gadalla
(74) *Attorney, Agent, or Firm* — Michael O'Keefe

(57) ABSTRACT

According to one embodiment, a method, computer system, and computer program product for CAPTCHA image generation and verification is provided. The embodiment may include generating a first set of attributes. The embodiment may also include generating an image from the first set of attributes. The embodiment may further include generating a plurality of attribute options where the plurality of attribute options comprises at least one attribute within the first set of attributes. The embodiment may also include displaying the generated image with the plurality of generated attribute options. The embodiment may further include prompting a user to select the at least one attribute from the plurality of generated attributes depicted in the displayed image. The embodiment may also include receiving a user selection based on the prompt. The embodiment may further include, in response to the received user selection being correct, verifying the user is a human.

17 Claims, 2 Drawing Sheets

CAPTCHA IMAGE GENERATION AND VERIFICATION BASED ON ATTRIBUTES

BACKGROUND

The present invention relates generally to the field of computing, and more particularly to challenge-response authentication.

Authentication relates to determining whether someone or something is actually who or what it purported to be. In the realm of computing, authentication relates to a user providing credentials that verify the user's identity to operate a device or program or access data. Three factors exist when seeking to obtain positive authentication: knowledge factors, ownership factors, and inherence factors. More secure authentication methods may aim to verify two or more factors (e.g. multi-factor authentication) while less secure authentication methods (e.g., single-factor authentication) may still be used under some circumstances but should be avoid in others, such as financial transaction-related authentications. Within these fields, various types of authentication exist including, but not limited to, strong authentication, continuous authentication, digital authentication, product authentication, and packaging.

In particular, challenge-response authentication relates to a subfield of authentication that relates to one entity providing a question that another party is required to provide a valid answer to in order to receive authentication. A common example of challenge-response authentication is a password prompt where a user is prompted to provide the password and the valid response sought by the authentication system is the correct password. Another common challenge-response authentication method is a Completely Automated Public Turing test to tell Computers and Humans Apart (CAPTCHA).

SUMMARY

According to one embodiment, a method, computer system, and computer program product for CAPTCHA image generation and verification is provided. The embodiment may include generating a first set of attributes. The embodiment may also include generating an image from the first set of attributes. The embodiment may further include generating a plurality of attribute options where the plurality of attribute options comprises at least one attribute within the first set of attributes. The embodiment may also include displaying the generated image with the plurality of generated attribute options. The embodiment may further include prompting a user to select the at least one attribute from the plurality of generated attributes depicted in the displayed image. The embodiment may also include receiving a user selection based on the prompt. The embodiment may further include, in response to the received user selection being correct, verifying the user is a human.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
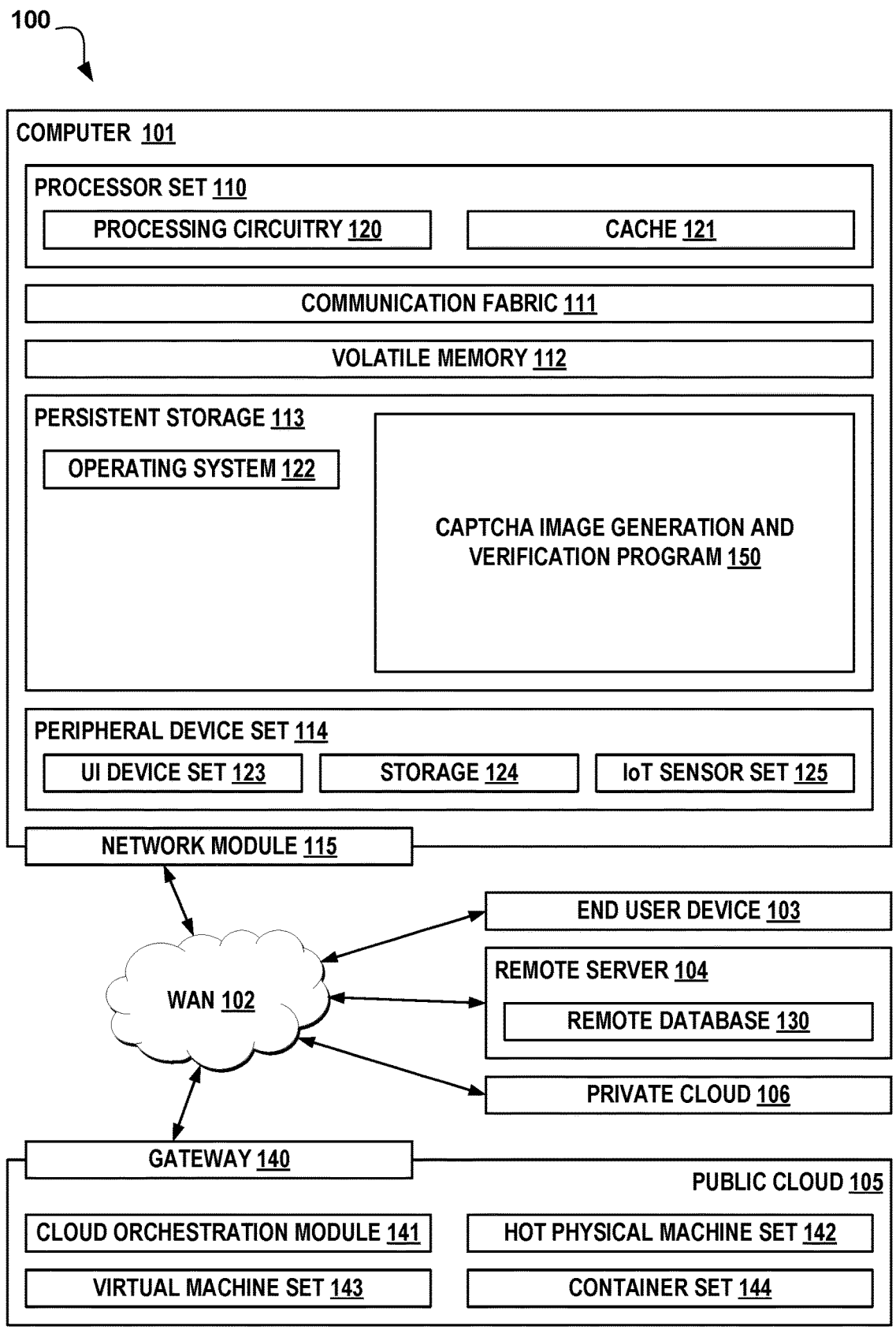
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to authentication. The following described exemplary embodiments provide a system, method, and program product to, among other things, utilize artificial intelligence engines and word and/or phrase generators to create Completely Automated Public Turing tests to tell Computers and Humans Apart (CAPTCHAs). Therefore, the present embodiment has the capacity to improve the technical field of authentication by removing the necessity to store images and text needed to conduct CAPTCHAs since such elements may be generated on-the-fly.

As previously described, authentication relates to determining whether someone or something is actually who or what it purported to be. In the realm of computing, authentication relates to a user providing credentials that verify the user's identity to operate a device or program or access data. Three factors exist when seeking to obtain positive authentication: knowledge factors, ownership factors, and inherence factors. The secure authentication methods may aim to verify two or more factors (e.g. multi-factor authentication) while less secure authentication methods (e.g., single-factor authentication) may still be used under some circumstances but should be avoid in others, such as financial transaction-related authentications. Within these fields, various types of authentication exist including, but not limited to, strong authentication, continuous authentication, digital authentication, product authentication, and packaging.

In particular, challenge-response authentication relates to a subfield of authentication that relates to one entity providing a question that another party is required to provide a valid answer to in order to receive authentication. A common example of challenge-response authentication is a password prompt where a user is prompted to provide the password and the valid response sought by the authentication system is the correct password. Another common challenge-response authentication method is a CAPTCHA.

A CAPTCHA relates to the presentation of an image and the subsequent entering of a response to the image. As its name implies, a CAPTCHA is utilized to prevent bot spamming and raiding by asking for information unintelligible by a computer but, typically, decipherable to a human. Common CAPTCHAs involve a user typing in an alphanumeric sequence into a text entry box based on characters presented in an obscured image or user selections of images that present specific characteristics the user is prompted to choose. Although CAPTCHAs require little human maintenance and offer certain spam protection for the websites that utilize them, CAPTCHAs have been criticized by individuals with conditions that may find some CAPTCHAs difficult to decipher.

Since the inception of CAPTCHAs in the $20^{th}$ century, text-to-image generation in the field of artificial intelligence have improved significantly. Highlighted by projects such as DALL-E, DALL-E 2, and Midjourney® (Midjourney and all Midjourney-based trademarks and logos are trademarks or registered trademarks of Midjourney, Inc. and/or its affiliates), text-to-image generation is now capable of ingesting one or more word prompts and generating an image, or a series of images, containing the characteristics of the prompt.

Current methods of CAPTCHA generation involve the storage of a significant number of tagged images. Additionally, many of the images are real world images which may result in an invasion of privacy through the disclosure of personally identifiable information (PII) or require the censoring of PII, which may be burdensome on computer and human resources. Furthermore, since labelled data is the fuel that power machine learning, many CAPTCHA answers are used to improve machine learning and artificial intelligence models. As such, it may be advantageous to, among other things, implement artificial intelligence image generation techniques when performing CAPTCHA authentications.

According to one embodiment, a CAPTCHA image generation and verification program may generate a CAPTCHA image and verify it automatically against a machine learning and/or artificial intelligence engine. The CAPTCHA image generation and verification program may generate an image in the CAPTCHA from a random set of n attributes and prompt the user to select a set of attributes that are present in the generated image from another set of random attributes of which a subset are the same as a portion of the random set of n attributes. Therefore, the CAPTCHA image generation and verification program may generate an image, from an artificial intelligence image generator, relating to certain attributes, determined from a random phase generator, and require a user to identify which attribute(s) from a list of attributes are present in the generated image to determine if the CAPTCHA should verify through an image verification engine.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as CAPTCHA image generation and verification program 150. In addition to CAPTCHA image generation and verification program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and CAPTCHA image generation and verification program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in CAPTCHA image generation and verification program 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in CAPTCHA image generation and verification program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to at least one embodiment, the CAPTCHA image generation and verification program 150 may generate a set of n attributes that may in turn be used to generate an image using an artificial intelligence and machine learning engine. The CAPTCHA image generation and verification program 150 may then generate a second set of attributes to present to a user for the verification process. The separate set of attributes may include a subset that include one or more of the set of n attributes. The CAPTCHA image generation and verification program 150 may then prompt the user to select the subset from the presented second set based on the user's observation of the generated image. Based on the user selection, the CAPTCHA image generation and verification program 150 may verify the user. Furthermore, notwithstanding depiction in computer 101, the CAPTCHA image generation and verification program 150 may be stored in and/or executed by, individually or in any combination, end user device 103, remote server 104, public cloud 105, and private cloud 106. The CAPTCHA image generation and verification method is explained in more detail below with respect to FIG. 2.

Figure 2:
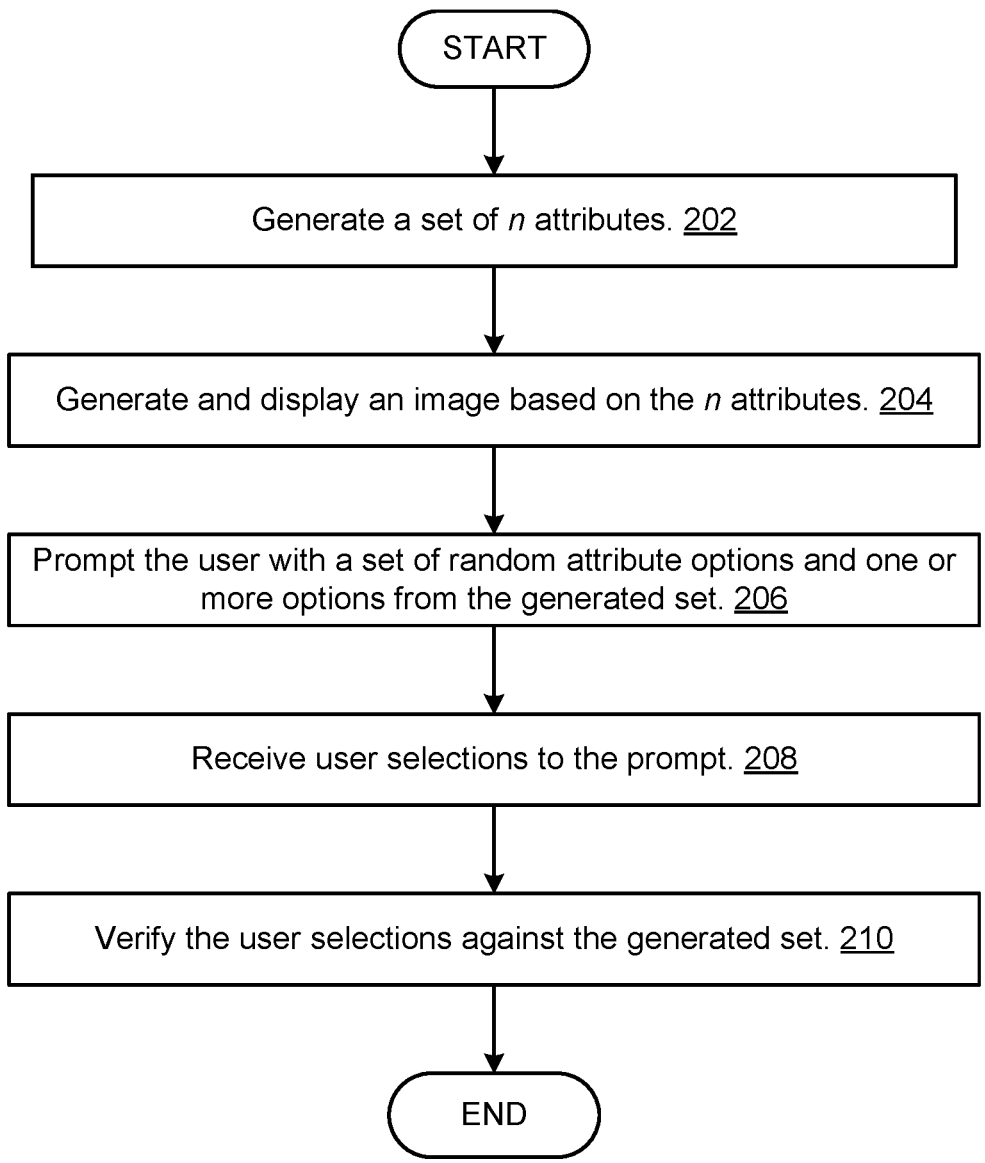
FIG. 2 illustrates an operational flowchart for a CAPTCHA image generation and verification process according to at least one embodiment.

Referring now to FIG. 2, an operational flowchart for a CAPTCHA image generation and verification process 200 is depicted, according to at least one embodiment. At 202, the CAPTCHA image generation and verification program 150 generates a set of n attributes. For an artificial intelligence engine to properly generate an image, the engine may require one or more prompts, such as words or sentences, that are to be input. Typically, a user may input the prompts through a text entry box. For example, the user may type the prompts to the engine through user interactions with a peripheral device, such as a device within device set 123. However, the CAPTCHA image generation and verification program 150 may generate the prompts in the form of a set of n attributes to be input. The set of n attributes may include any preconfigured number of attributes. In one or more embodiments, the n attributes may comprise nouns, adjectives, adverbs, verbs, or any other grammatical parts of speech capable of being input to an artificial intelligence image generator to create an image. For example, if the set of n attributes is preconfigured to generate five attributes, the CAPTCHA image generation and verification program 150 may generate the words "ocean", "boy", "summer", "cup", and "hut".

The CAPTCHA image generation and verification program 150 may utilize a random phrase generator or a random word generator when generating the set of n attributes. In one or more embodiments, the random phrase generator and/or random word generator may utilize pseudorandom phrase and/or word generation. In one or more other embodiments, the CAPTCHA image generation and verification program 150, through the random phrase or word generators, may select the set of n attributes from a preconfigured list of words and/or phrases through one or more randomization or pseudorandomization algorithms.

In at least one embodiment, the CAPTCHA image generation and verification program 150 may vary the number of attributes in the set of n attributes based on one or more previous failed or verified attempts associated with a particular user device. For example, if a user successfully verified from a specific device previously when a set of five attributes were used to generate the artificial intelligence image, the CAPTCHA image generation and verification program 150 may generate a smaller set of n attributes (e.g., three or four attributes). Conversely, if previous verification attempts were failed, the CAPTCHA image generation and verification program 150 may determine a bot attempted the CAPTCHA and, in order to prevent further attempts that may result in inadvertent verification, the CAPTCHA image generation and verification program 150 may increase the number of attributes in the set of n attributes (e.g., six or seven attributes).

Next, at 204, the CAPTCHA image generation and verification program 150 generates and displays an image based on the n attributes. Upon generating the set of n attributes, the CAPTCHA image generation and verification program 150 may input the generated attributes to the artificial intelligence image generator, which may be integrated within or communicatively coupled to the CAPTCHA image generation and verification program 150. As previously described, text-to-image generation by an artificial intelligence image generator may allow for the inputting of one or more word prompts and generating an image, or a series of images, containing the characteristics of the prompt. To input the set of n attributes to the artificial intelligence generator, the CAPTCHA image generation and verification program 150 may interact with the artificial intelligence generator in any number of ways including, but not limited to, integration of the artificial intelligence image generator into the CAPTCHA image generation and verification program 150 and communicative coupling of the artificial intelligence image generator to the CAPTCHA image generation and verification program 150 through one or more communication channels, such as an application programming interface (API). Once the set of n attributes are inputted to the artificial intelligence image generator, the CAPTCHA image generation and verification program 150 may generate, or instruct the artificial intelligence image generator to generate, the image based on the five attributes. For example, continuing the above situation where the set of n attributes includes the words "ocean", "boy", "summer", "cup", and "hut", the CAPTCHA image generation and verification program 150 may generate a beach scene-type image that depicts a boy playing by the ocean in summer with a cup and a hut in the background.

Then, at 206, the CAPTCHA image generation and verification program 150 prompts the user with a set of random attribute options and one or more options from the generated set. Once the image is generated, the CAPTCHA image generation and verification program 150 may present the image to the user and prompt the user with a set of random attribute options where a subset of one or more options within the set of random attribute options is from the generated set of n attributes. The CAPTCHA image generation and verification program 150 may display the generated image and the set of random attribute options to the user on a device display screen with a prompt for the user to select one or more options within the set of random attribute options that are depicted within the generated and displayed image.

The CAPTCHA image generation and verification program 150 may utilize any preconfigured number of options in the set of random attribute options but, typically, the number of options in the set of random attribute options may be larger than the one or more options from the generated list. For example, the CAPTCHA image generation and verification program 150 may present the set of random attribute options as "switch", "light", "clouds", "cup", and "leaf". In the case of the previously described example, the word "cup" appears in both the set of n attributes generated in step 202 and in the set of random attribute options. Furthermore, the each word in the set of random attribute options, aside from the subset that is present on both the set of n attributes and the set of random attribute options, may be different from the words of phrases on the set of n attribute options. The CAPTCHA image generation and verification program 150 may achieve this through a disallow list when utilizing the random, or pseudorandom, word generator or the random, or pseudorandom, phrase generator, which may cause the generator to select any word or phrase except those on the disallow list.

In one or more embodiments, the CAPTCHA image generation and verification program 150 may utilize the random phrase generator or random word generator, described above, to generate the set of random attribute options. Similarly, the CAPTCHA image generation and verification program 150 may utilize pseudorandom algorithms when generating the set of random attribute options.

In one or more other embodiments, the CAPTCHA image generation and verification program 150 may utilize attribute pairs within the set of random attributes. For example, the CAPTCHA image generation and verification program 150 may generate word pairs of "boots, switch", "laptop, light", "brick, clouds", "ocean, cup", and "chair, leaf" for the previous described exemplary image of a boy playing by the ocean in summer with a cup and a hut in the background. In such a situation, the word pair "ocean, cup" may apply to the generated image and, if selected by the user, may lead to verification by the CAPTCHA image generation and verification program 150.

Next, at 208, the CAPTCHA image generation and verification program 150 receives user selections to the prompt. As previously described, the CAPTCHA image generation and verification program 150 may prompt the user to select one or more options from the displayed random attributes that are depicted in the generated image. The user may select the options using one or more selectable user interactions with a graphical user interface, such as a radio box juxtaposed to the displayed word or phrase or an icon with the word or phrase depicted selectable using a peripheral device (e.g., a mouse or a keyboard). Once selected, the CAPTCHA image generation and verification program 150 may immediately receive the selections or may receive the selections once the user interacts with a confirmation icon or button. For example, continuing the previous example, the CAPTCHA image generation and verification program 150 may immediately receive the selection upon user selecting the option "cup" from the displayed options or the CAPTCHA image generation and verification program 150 may send the selection "cup" once the user interacts with a confirmation button.

Then, at 210, the CAPTCHA image generation and verification program 150 verifies the user selections against the generated set. Upon receiving the user selections, the CAPTCHA image generation and verification program 150 may verify whether the selections are accurate and verify or incorrect and deny. The CAPTCHA image generation and verification program 150 may verify whether the selection(s) are accurate based on a comparison of the selected option against the random options displayed on the graphical user interface. For example, again continuing the previous example where the user selects "cup" from the given options, the CAPTCHA image generation and verification program 150 may compare the user selection of "cup" to the set of n attributes through textual analysis to determine if "cup" was one of the random words or phrases generated. Once the CAPTCHA image generation and verification program 150 verifies the user selection is correct based on the verification process, the CAPTCHA image generation and verification program 150 may allow the user to proceed to the desired destination or program.

In at least one other embodiment, the CAPTCHA image generation and verification program 150 may verify the selection(s) are accurate through an analysis of the generated and displayed image using image recognition technology. In such a situation, the CAPTCHA image generation and verification program 150 may perform image analysis of the generated image to specifically identify whether the user selection is present within the generated image. For example, if the user selection is "cup" and the beach scene described above is the generated image, the CAPTCHA image generation and verification program 150 may perform image analysis to determine whether a "cup" is depicted in the image. The CAPTCHA image generation and verification program 150 may perform image analysis in embodiments where the CAPTCHA image generation and verification program 150 does not store, either due to storage limitations or storage permission restrictions, the set of n attributes after the generation of the image.

It may be appreciated that FIG. 2 provides only an illustration of one implementation and does not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
   generating a prompt with a first set of attributes, wherein the first set is descriptive of an image for generation, and wherein a number of attributes within the first set is varied based on failed previous attempts and successful previous attempts associated with a user device;
   generating the image from the first set of attributes;
   generating a plurality of attribute options, wherein the plurality of attribute options comprises at least one attribute within the first set of attributes;
   displaying the generated image with the plurality of generated attribute options as a CAPTCHA;
   prompting a user to select the at least one attribute from the plurality of generated attributes depicted in the displayed image;
   receiving a user selection based on the prompting; and
   in response to the received user selection being correct, verifying the user is a human.

2. The method of claim 1, wherein the image is generated using a trained, artificial intelligence model.

3. The method of claim 1, wherein the first set of attributes are generated using a generator selected from a group consisting of a random word generator, a random phrase generator, a pseudorandom word generator, and a pseudorandom phrase generator.

4. The method of claim 2, wherein the plurality of attribute options are generated by the generator.

5. The method of claim 1, wherein the verifying is performed through image recognition performed on the displayed image in order to identify a presence of the at least one attribute in the displayed image.

6. The method of claim 1, wherein words or phrases within the plurality of attribute options are different than words or options within the generated first set of attributes except for the at least one attribute.

7. A computer system, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   generating a prompt with a first set of a plurality of attributes, wherein the first set is descriptive of an image for generation, and wherein a number of attributes within the first set is varied based on failed previous attempts and successful previous attempts associated with a user device;
   generating the image from the first set of attributes;
   generating a plurality of attribute options, wherein the plurality of attribute options comprises at least one attribute within the first set of attributes;
   displaying the generated image with the plurality of generated attribute options as a CAPTCHA;
   prompting a user to select the at least one attribute from the plurality of generated attributes depicted in the displayed image;
   receiving a user selection based on the prompting; and
   in response to the received user selection being correct, verifying the user is a human.

8. The computer system of claim 7, wherein the image is generated using a trained, artificial intelligence model.

9. The computer system of claim 7, wherein the first set of attributes are generated using a generator selected from a group consisting of a random word generator, a random phrase generator, a pseudorandom word generator, and a pseudorandom phrase generator.

10. The computer system of claim 8, wherein the plurality of attribute options are generated by the generator.

11. The computer system of claim 7, wherein the verifying is performed through image recognition performed on the displayed image in order to identify a presence of the at least one attribute in the displayed image.

12. The computer system of claim 7, wherein words or phrases within the plurality of attribute options are different than words or options within the generated first set of attributes except for the at least one attribute.

13. A computer program product, the computer program product comprising:

one or more computer-readable tangible storage medium and program instructions stored on at least one of the one or more tangible storage medium, the program instructions executable by a processor capable of performing a method, the method comprising:

generating a prompt with a first set of a plurality of attributes, wherein the first set is descriptive of an image for generation, and wherein a number of attributes within the first set is varied based on failed previous attempts and successful previous attempts associated with a user device;

generating the image from the first set of attributes;

generating a plurality of attribute options, wherein the plurality of attribute options comprises at least one attribute within the first set of attributes;

displaying the generated image with the plurality of generated attribute options as a CAPTCHA;

prompting a user to select the at least one attribute from the plurality of generated attributes depicted in the displayed image;

receiving a user selection based on the prompting; and in response to the received user selection being correct, verifying the user is a human.

14. The computer program product of claim 13, wherein the image is generated using a trained, artificial intelligence model.

15. The computer program product of claim 13, wherein the first set of attributes are generated using a generator selected from a group consisting of a random word generator, a random phrase generator, a pseudorandom word generator, and a pseudorandom phrase generator.

16. The computer program product of claim 14, wherein the plurality of attribute options are generated by the generator.

17. The computer program product of claim 13, wherein the verifying is performed through image recognition performed on the displayed image in order to identify a presence of the at least one attribute in the displayed image.

* * * * *